June 18, 1963 J. J. TURIN 3,094,316
SHAFT FURNACE
Filed July 7, 1960 2 Sheets-Sheet 2

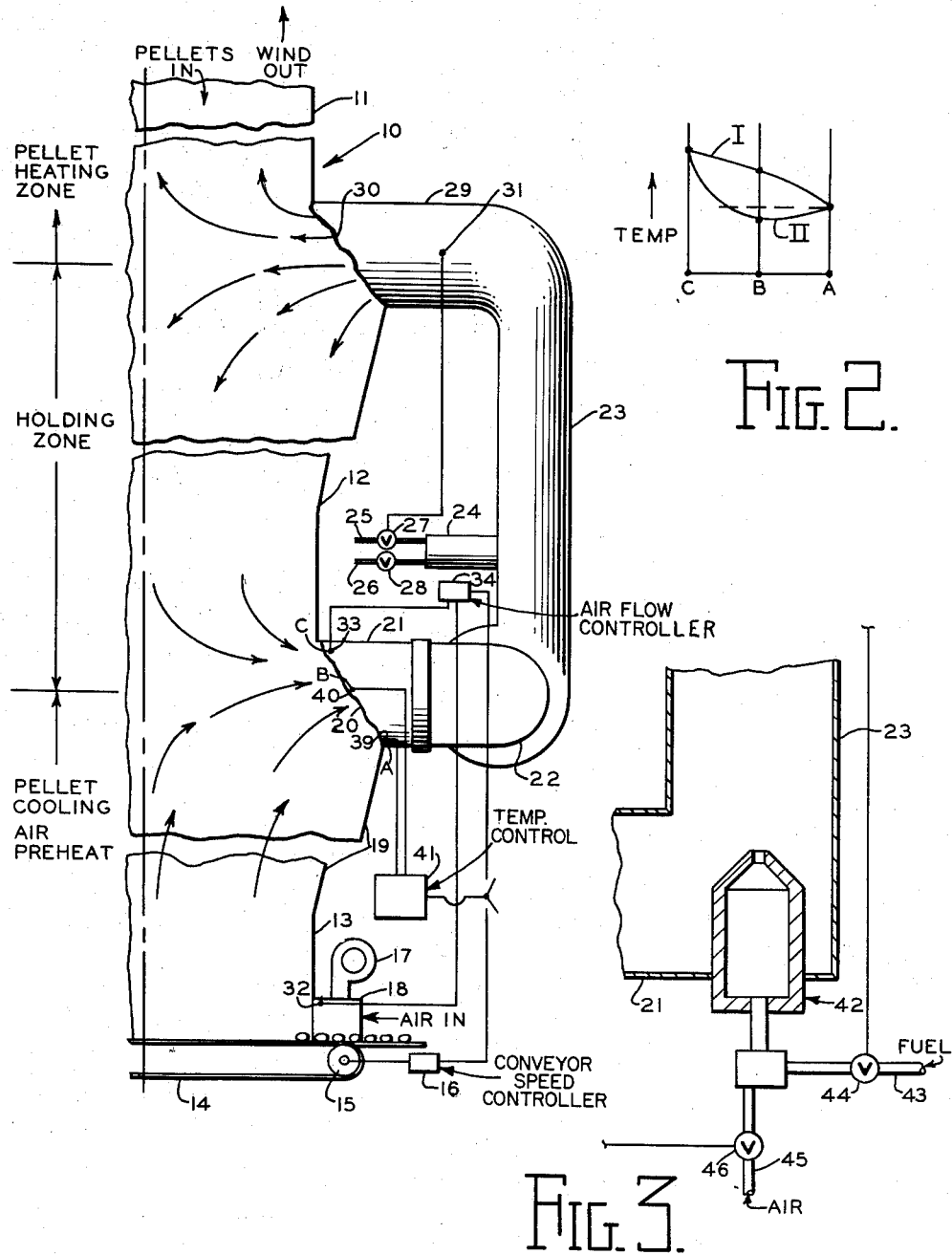

INVENTOR.
JOHN J. TURIN
BY
Alfred L. Patmore, Jr.
Attorney

United States Patent Office 3,094,316
Patented June 18, 1963

3,094,316
SHAFT FURNACE
John J. Turin, Toledo, Ohio, assignor to Midland-Ross Corporation, Toledo, Ohio, a corporation of Ohio
Filed July 7, 1960, Ser. No. 41,361
6 Claims. (Cl. 263—29)

This invention relates to an improved shaft furnace, and, more particularly, to improved apparatus and an improved method for controlling the temperature of work in such a furnace.

Shaft furnaces of the type contemplated by the instant invention are known, and have been suggested for the sintering of agglomerates of refractory materials such as MgO, $Al_2O_3$ and the like. An idealized furnace of such type might be characterized as a self-sustaining apparatus because pellets or other agglomerates charged, in a cold condition, to the upper portion thereof travel downwardly countercurrent to air or another gas and are heated to a sintering temperature in an intermediate portion of the furnace which is usually near the top thereof, and then are gradually cooled as they travel on downwardly through the furnace until they are discharged cold. Air, on the other hand, is admitted to the bottom of the shaft in a cold condition and is gradually heated as it flows upwardly through the furnace, by contact with the pellets or other agglomerates which it cools, until it reaches the sintering region, and above such region is again cooled until it is discharged at the same temperature that it entered. Such idealized operation would be possible only at a blow ratio [1] of one, and only if the furnace were perfectly insulated so that the only heat exchange occurring would be between the pellets or other agglomerates and air or other gas, and only if heat exchange between the pellets or the like and the air or other gas were perfect. Even if such idealized operation were possible, the starting of such a furnace would be extremely difficult. In addition, the idealized operation is impossible, not only because heat losses from the furnace are unavoidable, but also because perfect heat exchange between the pellets and the wind is impossible in any practical installation.

Shaft furnaces have also been suggested where auxiliary burners are provided to generate a volume of combustion products and excess air, heated to a relatively high temperature, for example from about 1800° F. to about 2200° F., and where these heated gases are introduced into an intermediate portion of the shaft furnace below the sintering region. It has been suggested that the air of such mixture be withdrawn from the lower portion of the shaft furnace, and, as an alternate, that the rate of introduction of air into the bottom of the shaft furnace be reduced by the rate at which heated air is introduced into the intermediate portion of the furnace below the sintering region.

It has been found, however, that wind flowing through such a furnace flows upwardly in an effective path which is substantially parallel to the axis of the shaft. Most of the molecules of air that are introduced into the bottom of the furnace will emerge from the top thereof in substantially an unchanged position relative to the furnace walls and the axis, notwithstanding that the instantaneous direction must change every time an air molecule impinges upon a pellet or other agglomerate within the furnace. A similar phenomenon has been observed with respect to the pellets: a vast majority of them emerge from the bottom of the furnace in substantially the same positions relative to the furnace walls and the axis thereof in which they were charged. As a consequence, when wind is withdrawn from the periphery of such a furnace at an intermediate vertical point, the withdrawn wind is that which had been flowing in an annular region of the furnace adjacent the exterior wall thereof, and wind which had been flowing upwardly through the furnace interior, relative to the annular region, continues principally to flow upwardly, above the wind outlet, through the interior but moves laterally somewhat to compensate for the withdrawn wind. Similarly, when heated wind is reintroduced into the furnace at a point above such a wind outlet, or even into a furnace which has no such wind outlet, such heated reintroduced wind flows upwardly through an annular region of the furnace which is adjacent the sidewalls thereof, and without substantial intermingling or heat exchange with wind in the furnace interior, relative to such annular region, at least in any shaft furnace which is of a commercially useful height. Relative to the interior wind, the principal effect of the reintroduced wind is to cause a limited inward, lateral movement. The wind which flows through the furnace interior, inside the annular ring, is essentially that which was introduced into the bottom of the furnace, and is not significantly affected by the auxiliary heating. As a consequence, auxiliary heating, as heretofore practiced, is effective to counteract heat losses from the exterior of a shaft furnace to its surroundings, as well as to establish the required temperature conditions in conjunction with the beginning of the operation of the shaft furnace, but is ineffective in any shaft furnace of a commercially useful height to provide effective temperature control throughout the entire cross section of the furnace in the sintering region. As a consequence, in such a shaft furnace wherein the material being treated is substantially inert such as MgO, $Al_2O_3$ and the like, the temperature in the sintering region varies as a direct function of distance from the axis of the shaft.

The instant invention is based upon the discovery of an improved shaft furnace of a commercially practical height, wherein the sintering temperature of pellets of magnesia, alumina, or the like is positively controlled and uniformly across the diameter of the furnace. The invention is also based upon the discovery of an improved method for operating shaft furnaces.

It is, therefore, an object of the invention to provide an improved shaft furnace.

It is a further object of the invention to provide a method for controlling the temperature distribution of pellet-like material in a shaft furnace.

Other objects and advantages will be apparent from the description which follows, reference being made to the attached drawings, in which:

FIG. 1 is a partially schematic view in vertical elevation, with parts broken away to show details of construction, of an improved shaft furnace according to the invention;

FIG. 2 is a plot under two different conditions of operation of the furnace of FIG. 1, showing temperatures which prevail under such different conditions at three points which are designated in FIG. 1;

FIG. 3 is a fragmentary vertical elevational view showing a modification of the apparatus of FIG. 1 wherein a jet pump burner is used instead of a blower;

Figure 4:
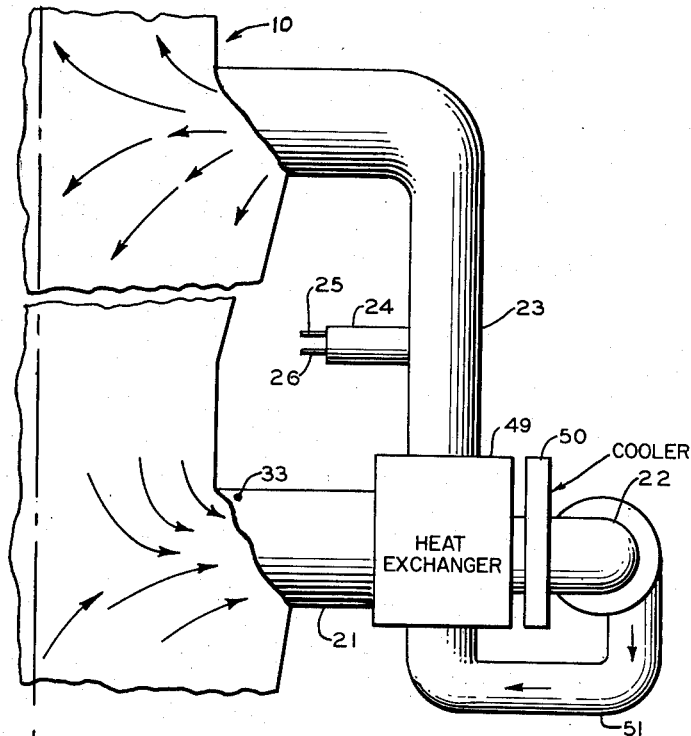
Figure 5:
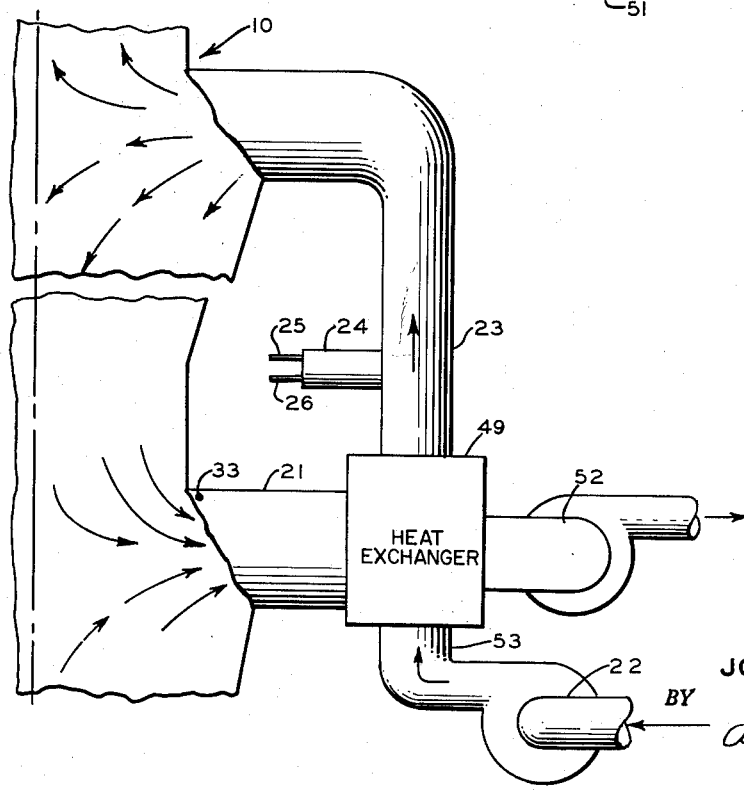

FIG. 4 is a fragmentary view in vertical elevation similar to FIG. 1, but showing additional heat exchangers which enable a fan that is an essential element of the FIG. 1 apparatus to operate at a comparatively low temperature; and FIG. 5 is a fragmentary vertical elevational view of apparatus similar to that shown in FIG. 4, but wherein wind withdrawn from the furnace is subjected to heat exchange and then ejected to atmosphere, while fresh cold ---
[1] A shaft furnace is considered to be operated at a blow ratio of one when the rate of gas flow upwardly therethrough times its specific heat equals the rate of downward flow of pelletized or the like material times its specific heat.

air is heated and then introduced into the furnace to effect temperature control.

Referring now in more detail to the drawings, and, in particular, to FIG. 1, a shaft surface is designated generally at 10. The furnace 10 is symmetrical about its center line, which is designated conventionally, so that only one-half thereof is represented. The furnace has an upper cylindrical portion 11, a central cylindrical portion 12, and a lower cylindrical portion 13, the three portions 11, 12 and 13 constituting a vertically extending heating chamber of the furnace 10. Pellets, for example, of a pressed magnesia are charged into the open top of the upper cylindrical portion 11, and flow downwardly by gravity through the entire furnace until they are collected on a belt-type conveyor 14 suitably driven by a variable speed motor 15, the speed of which is determined by a speed controller 16. The rate at which the pellets travel through the furnace 10 depends upon the rate at which the conveyor 14 is driven by the motor 15. Air or another gas or a compressible fluid is introduced into the furnace 10 near the bottom of the lower cylindrical section 13 by a blower 17, and through an air inlet 18. The air or the like travels upwardly through the furnace 10, countercurrent to the movement of pellets therethrough. In the main, the lower cylindrical portion 13 of the furnace 10 is a cooling zone wherein the pellets are cooled by the countercurrently flowing air. The gas or compressible fluid within the cooling and other zones of the FIG. 1 apparatus will herein be designated "wind" to indicate that it is not necessarily air. Above the lower cylindrical portion 13, the furnace 10 includes a portion 19 which tapers outwardly to a wind outlet 20 which has an angle of repose such that pellets will not flow therethrough. All of the wind which passes through the lower cylindrical portion 13 is withdrawn from the furnace 10 through the outlet 20 and a conduit 21, and by a blower 22. The withdrawn wind is discharged by the blower 22 into a conduit 23, where it is heated by a burner 24 to which fuel and air are supplied from lines 25 and 26 at a rate which depends upon the instantaneous settings of valves 27 and 28, respectively. The heated wind is delivered from the conduit 23 through a return conduit 29 and an inlet 30 to the furnace 10 at a point immediately below the upper cylindrical portion 11. The firing of the burner 24 is controlled to maintain within predetermined limits the temperature in the return conduit 29, as indicated by a thermocouple 31.

By virtue of the withdrawal, through the outlet 20, of all of the wind which flows upwardly through the lower cylindrical portion 13, there is no upward flow of wind through the central cylindrical portion 12, and no opportunity for channeling of wind which flows upwardly through the interior of the central portion 12 and into and through the upper portion 11. In previously known shaft furnaces, such channeling occurred, and was responsible for the ineffectiveness of auxiliary wind at heating pellets traveling downwardly through the interior of the furnace. Within limits, regardless of the temperature to which the auxiliary wind was heated, the maximum temperature reached by the pellets in the interior of the furnace was determined by the temperature achieved by the wind traveling upwardly from the bottom to the top. In the FIG. 1 apparatus, however, such channeling is prevented, and the independence of maximum pellet temperature, in the interior of the shaft, is avoided. As will subsequently be discussed in more detail, the apparatus includes several control means to assure that substantially all of the wind which flows upwardly through the lower cylindrical portion 13 is withdrawn through the wind outlet 20, and also includes certain geometrical relationships to assure this result.

The shortest distance through the furnace 10 between the wind outlet 20 and the wind inlet 30 will normally be greater than the distance to the center-line of the furnace, i.e. the radius in the case of a round furnace. Wind flow sensing devices 32 and 33 are provided in the air inlet 18 and in the wind outlet 20, respectively, and signals from each are transmitted to a flow differential sensor and controller 34, which generates a signal that is utilized to control the operation of the blower 22. Specifically, the blower 22 is operated to maintain the flow sensed by the device 33 at least as high as that sensed by the device 32 at all times. Since, as has been indicated above, the distance between the inlet 30 and the outlet 20 is greater than the diameter of the furnace 10, whenever these two flows are equal, and also whenever the flow sensed by the device 33 exceeds that sensed by the device 32, there is no wind flow upwardly within the furnace from the discharge 20 to the inlet 30. In fact, in the latter case, there is a flow of wind downwardly through the furnace from the inlet 30 to the wind outlet 20, so that wind circulation is established as indicated by the arrows in FIG. 1. Channeling of the wind is then eliminated completely between the inlet 30 and the outlet 20, and the central portion 12 of the furnace is, in essence, a holding zone wherein the pellets or the like are maintained at substantially the temperature to which the wind is heated in the conduit 23 by the burner 24. The flow sensing devices 32 and 33 and the controller 34 are calibrated, of course, to measure and control in terms of total flow, rather than velocity.

The distance through the furnace 10 from the wind inlet 30 to the top is also greater than the diameter of the furnace in order to force the heated wind which travels upwardly from the inlet 30 to flow to the center of the furnace and thereby to cause uniform heating. Of course, as has been discussed above, there is no wind flowing upwardly into the upper cylindrical portion 11 of the furnace 10 from the intermediate portion 12 of the furnace so that achieving uniformity of flow above the wind inlet 30 is far easier, regardless of this dimension, than in previously known shaft furnaces.

Reference is now made to FIG. 2, which shows temperatures at three points, A, B and C, in the wind outlet 20, under two different conditions of operation. Curve I shows temperature relationships which indicate that the apparatus is operating according to the invention, while curve II indicates operation not in accordance with the invention. In curve I, the temperature at a point C is higher than the temperature at a point B, which, in turn, is higher than the temperature at a point A. In curve II, however, while the temperatures at the points C and A are unchanged, the temperature at the point B is lower than that at the point A. Referring again to FIG. 1, it will be noted that the points A, B and C are in the wind outlet 20, and that the point A is at the bottom thereof, the point C at the top thereof, and the point B intermediate between the points A and C. Whenever wind flows downwardly from the inlet 30 to the outlet 20, the temperature at the point C will be higher than that at the point A, since the temperature at the former point will be controlled essentially by the downwardly flowing, pre-heated wind, while the temperature at the point A will be controlled principally by the wind which has merely passed upwardly through and cooled the pellets. If, when the furnace blow ratio is at least one, wind flows upwardly through the central portion of the lower cylindrical furnace part 13, and then directly upwardly through the central part of the intermediate cylintrical furnace portion 12 and the upper cylindrical furnace portion 11, the temperature at an intermediate point within the wind outlet 20, or at the point B, will also be controlled by the wind from the lower furnace portion 13 but from the central region thereof. Under such conditions of operation, this central wind will channel, as discussed above, and will prevent effective heating of pellets in the central portion of the sintering region. As a consequence, the sintering region temperature will be low in the central portion, or near the furnace axis, and this will cause a low wind temperature in the central region of the lower furnace portion 13 and a temperature at the point B below the temperature at the point A. Control of the furnace of FIG. 1 on the basis of temperature scanning in the wind outlet is also contemplated. This alternate or additional control includes thermocouples 39 and 40, which are positioned at the points A and B, respectively. Signals from the thermocouples 39 and 40 are sensed by a differential sensing controller 41 which causes an adjustment of the blower 22 whenever the temperature sensed at the point B is equal to or less than that sensed at the point A. Whenever the blow ratio through the lower cylindrical portion 13 of the furnace 10 is substantially theoretical, the temperature at the point B will be higher than that of the point A so long as all of the wind which travels upwardly through the lower cylindrical portion 13 and a slight excess is withdrawn from the furnace 10 through the outlet 20. Accordingly, the control just described can be utilized to maintain a preferred condition of furnace operation, i.e., withdrawal of at least a slight excess of wind through the outlet 20 to maintain some downward movement of wind through the intermediate cyldincral portion 12 of the furnace 10. The theoretical blow ratio is that at which the number of pounds of wind moving upwardly through the lower cylindrical portion 13, per unit of time, times its specific heat is substantially equal to the number of pounds of pellets or the like moving downwardly therethrough, per unit of time, times the specific heat or mean effective specific heat of the pellets or the like.

The controller 41 can also be used in conjunction with the controller 34 to effect an automatic adjustment of blow ratio. So long as the blower 22, under the control of the controller 34, is operated to withdraw wind through the outlet 20 at at least substantially the rate that wind travels upwardly through the lower cylindrical portion 13 of the furnace 10, a temperature at the point B lower than that of the point A indicates a blow ratio lower than theoretical. This is true because too low a blow ratio causes a drop in sintering region temperature, such drop being most pronounced near the axis of the furnace, and in turn causing a drop in wind temperature which is also most pronounced near the axis of the furnace. Accordingly, the controller 41 can also be used in conjunction with the controller 34 to cause an adjustment of the motor controller 16 to retard the rate of the motor 15 whenever the temperature sensed by the thermocouple 40 does not exceed that sensed by the thermocouple 39. This retards the rate of movement of the conveyor 14 and the rate of flow of pellets through the furnace 10, and correspondingly increases the rate of flow of wind relative to the rate of flow of pellets. Such change continues until the temperature sensed by the thermocouple 40 exceeds that sensed by the thermocouple 39.

The furnace 10 of FIG. 1 can be modified, as shown in FIG. 3, by elimination of the blower 22 and of the burner 24, and the addition of a jet pump burner indicated generally at 42. The burner 42 is positioned at the junction between the conduits 21 and 23, and is supplied with fuel from a line 43 at a rate controlled by a valve 44 which is adjusted to maintain within predetermined limits the temperature sensed by the thermocouple 31 (see FIG. 1). Air is also supplied to the burner 42 from a line 45 at a rate which depends upon the setting of a valve 46. The valve 46 is controlled, in the manner previously described, by the signal from the controller 34 to maintain the flow of wind sensed by the device 33 at least as high as that sensed by the device 32.

As shown in FIG. 4, wind in the conduit 21 can be passed first through the hot side of a heat exchanger 49 and then through a cooler 50 to the blower 22 which, in such situation, operates at a considerably lower temperature than in the apparatus of FIG. 1. The effluent from the blower 22 is then passed through conduits 51 to the cold side of the heat exchanger 49, and from thence to the conduit 23 where it is heated as previously described by the burner 24.

As shown in FIG. 5, the wind from the conduit 21 can be passed through the hot side of the heat exchanger 49 and then to the inlet of a blower 52, from which it is ejected to atmosphere. In this situation, the blower 22, controlled as described above in connection with FIG. 1, is then supplied with cold air which is passed through a conduit 53 to the cold side of the heat exchanger 49, and from thence into the conduit 23 where it is heated by the burner 24. The apparatus of FIG. 5 is particularly advantageous when the material being processed in the furnace 10 is likely to undergo comminution and form a dust which will fuse at the temperatures which prevail in the conduits 23 and 29. By heating only fresh air, which has had no opportunity to pick up dust from the furnace 10, all chance of the fusion of such dust and the collection thereof on the walls of the conduits is eliminated.

It will be appreciated that the apparatus and method of the instant invention enable the close control of sintering temperature of pressed bodies of alumina, magnesia or the like, and in shaft furnaces of sufficiently large cross section to be important commercially. Because uniform distribution of wind, or of the compressible fluid, within the sintering portions of the furnace 10 is assured, the temperature of such wind can control the sintering temperature uniformly. In such situation, even when the sintering operation involves an exothermic reaction, as in the sintering of certain iron ore pellets, the rate of heat transfer from the wind to the pellets or the like can be substantially increased by using a high wind temperature, and the peak or sintering temperature can be made to depend upon wind temperature so that close control can be achieved by regulation of wind temperature and rate of wind flow through the upper or sintering portion of the furnace.

When the sintering operation involves an exothermic reaction, it may not be necessary to add heat to the withdrawn wind. Under this circumstance, the wind withdrawal serves to mix all the wind to produce a uniform temperature, providing all the wind is removed and reintroduced to the furnace.

For the purposes of the appended claims, a pellet-like material will be defined as an agglomerate of smaller particles or granules formed from crushed rock or glass or any similar material requiring heating. Materials such as natural gravel, bearing balls and heat transfer balls come within this definition.

In a practical installation it is usually preferred to have the distance between the wind inlet and wind outlet close to a minimum equal to the radius or distance to the center-line of the furnace. However, it is possible by using high circulation rates to reduce this distance and still eliminate channeling of the wind, and, conversely, with low circulation rates it may be necessary to have the distance between the wind inlet and wind outlet equal to several times the diameter of the furnace.

While the invention has been described in connection with a furnace that is cylindrical in cross section, it will be appreciated that it is equally applicable to shaft furnaces of other section, e.g., square and rectangular. It will be apparent also that other various changes and modifications can be made from the specific details disclosed herein without departing from the spirit and scope of the invention as defined in the appended claims.

I claim:

1. Control means in combination with a shaft furnace comprising means constituting a vertically extending heat treating chamber having a lower compressible fluid inlet end and an upper compressible fluid discharge end, and through which pellet-like material flows downwardly, said chamber having an upper continuous portion of substantially constant cross-sectional area from its fluid discharge end and extending throughout a substantial adjacent portion of its vertical extent, having an intermediate continuous portion immediately adjacent said upper portion and having at least substantially as great a cross-sectional area as said upper continuous chamber portion, said upper and intermediate chamber portions having a longitudinal extent which exceeds the lateral distance to the center lines thereof, and having a lower portion extending to its fluid inlet end, and means effective to cause a compressible fluid to flow upwardly through the lower portion of the chamber countercurrent to, and in heat exchange relationship relative to the pellet-like material, said control means comprising, in combination, means for withdrawing a first stream of the compressible fluid from the lower end of said intermediate portion of said chamber, means for returning a second stream of a compressible fluid to the lower end of said upper portion of said chamber, means for heating the second stream to a temperature above the maximum required material temperature, and means effective to control the weight per unit of time flowing in each of the first and second streams at least substantially as high as the weight per unit of time of compressible fluid flowing upwardly through the chamber below the region of withdrawal of the first stream.

2. Apparatus as claimed in claim 1 wherein said means for returning a fluid to said chamber is effective to receive and return to said chamber the stream withdrawn from the lower end of the intermediate portion thereof.

3. In a method for heat treating pellet-like material which comprises flowing the material downwardly through a shaft furnace disposed about an imaginary center line, having a lower compressible fluid inlet end and an upper compressible fluid outlet end, having an upper continuous portion of substantially constant cross-sectional area from its fluid discharge end and extending throughout a substantial adjacent portion of its vertical extent, having an intermediate continuous portion immediately adjacent the upper portion and having at least substantially as great a cross-sectional area as the upper continuous portion, the upper and intermediate continuous portions having a longitudinal extent which exceeds the lateral distance to the center lines thereof, and having a lower portion extending to its fluid inlet end, and causing a compressible fluid to flow upwardly through the furnace relative to the material, the improvement which comprises controlling the maximum material temperature by withdrawing a stream of the compressible fluid from the lower end of the continuous intermediate portion of the furnace, returning a second stream of a compressible fluid to the lower end of the upper continuous portion, heating the second stream to a temperature above the maximum required material temperature and controlling the weight per unit of time flowing in each of the first and second streams to be at least substantially as high as the weight per unit of time of compressible fluid flowing upwardly through the furnace below the region of withdrawal of the first stream from the furnace.

4. In a method for heat treating pellet-like material which comprises flowing the material downwardly through a shaft furnace disposed about an imaginary center line, having a lower compressible fluid inlet end and an upper compressible fluid outlet end, having an upper continuous portion of substantially constant cross-sectional area from its fluid discharge end and extending throughout a substantial adjacent portion of its vertical extent, having an intermediate continuous portion immediately adjacent the upper portion and having at least substantially as great a cross-sectional area as the upper continuous portion, the upper and intermediate continuous portions having a longitudinal extent which exceeds the lateral distance to the center lines thereof, and having a lower portion extending to its fluid inlet end, and causing a compressible fluid to flow upwardly through the furnace relative to the material, the improvement which comprises controlling the maximum material temperature by withdrawing a stream of the compressible fluid from the lower end of the continuous intermediate portion of the furnace, returning a second stream of a compressible fluid to the lower end of the upper continuous portion, and controlling the weight per unit of time flowing in each of the first and second streams to be at least substantially as high as the weight per unit of time of compressible fluid flowing upwardly through the furnace below the region of withdrawal of the first stream from the furnace.

5. Control means in combination with a shaft furnace comprising means constituting a vertically extending heat treating chamber having a lower compressible fluid inlet end and an upper compressible fluid discharge end, and through which pellet-like material flows downwardly, said chamber having an upper continuous portion of substantially constant cross-sectional area from its fluid discharge end and extending throughout a substantial adjacent portion of its vertical extent, having an intermediate continuous portion immediately adjacent said upper portion and having at least substantially as great a cross-sectional area as said upper continuous chamber portion, said upper and intermediate chamber portions having a longitudinal extent which exceeds the lateral distance to the center lines thereof, and having a lower portion extending to its fluid inlet end, and means effective to cause a compressible fluid to flow upwardly through the lower portion of the chamber countercurrent to, and in heat exchange relationship relative to the pellet-like material, said control means comprising, in combination, means for withdrawing a stream of the compressible fluid from the lower end of said intermediate portion of said chamber, means for returning a second stream of a compressible fluid to the lower end of said upper portion of said chamber, and means effective to control the weight per unit of time flowing in each of the first and second streams at least substantially as high as the weight per unit of time of compressible fluid flowing upwardly through the chamber below the region of withdrawal of the first stream.

6. Control means in combination with a shaft furnace comprising means constituting a vertically extending heat treating chamber having a lower compressible fluid inlet end and an upper compressible fluid discharge end, and through which pellet-like material flows downwardly, said chamber having an upper continuous portion of substantially constant cross-sectional area from its fluid discharge end and extending throughout a substantial adjacent portion of its vertical extent, having an intermediate continuous portion immediately adjacent said upper portion and having at least substantially as great a cross-sectional area as said upper continuous chamber portion, and having a lower portion extending to its fluid inlet end, and means effective to cause a compressible fluid to flow upwardly through the lower portion of the chamber countercurrent to, and in heat exchange relationship relative to the pellet-like material, said control means comprising, in combination, means for withdrawing a stream of the compressible fluid from the lower end of said intermediate portion of said chamber, means for returning a second stream of a compressible fluid to the lower end of said upper portion of said chamber, and means effective to control the weight per unit of time flowing in each of the first and second streams at least substantially as high as the weight per unit of time of compressible fluid flowing upwardly through the chamber below the region of withdrawal of the first stream.

References Cited in the file of this patent

UNITED STATES PATENTS

| | | |
|---|---|---|
| 2,345,067 | Osann | Mar. 28, 1944 |
| 2,512,442 | Norton | June 20, 1950 |
| 2,521,830 | Collins | Sept. 12, 1950 |
| 2,533,142 | Royster | Dec. 5, 1950 |
| 2,670,946 | Royster | Mar. 2, 1954 |
| 2,676,095 | De Vaney et al. | Apr. 20, 1954 |
| 2,739,800 | Sisco | Mar. 27, 1956 |